(12) United States Patent
Speldrich et al.

(10) Patent No.: US 12,474,224 B2
(45) Date of Patent: Nov. 18, 2025

(54) SILICON PIEZORESISTOR FORCE SENSOR

(71) Applicant: Honeywell International Inc., Charlotte, NC (US)

(72) Inventors: Brian Speldrich, Freeport, IL (US); Richard Alan Davis, Plano, TX (US)

(73) Assignee: Honeywell International Inc., Charlotte, NC (US)

( * ) Notice: Subject to any disclaimer, the term of this patent is extended or adjusted under 35 U.S.C. 154(b) by 317 days.

(21) Appl. No.: 18/150,692

(22) Filed: Jan. 5, 2023

(65) Prior Publication Data
US 2023/0146578 A1 May 11, 2023

Related U.S. Application Data

(63) Continuation of application No. 16/573,500, filed on Sep. 17, 2019, now Pat. No. 11,573,136, which is a continuation of application No. 15/388,483, filed on Dec. 22, 2016, now abandoned.

(51) Int. Cl.
G01L 1/18 (2006.01)
G01L 1/22 (2006.01)

(52) U.S. Cl.
CPC .............. *G01L 1/18* (2013.01); *G01L 1/2206* (2013.01); *G01L 1/2293* (2013.01)

(58) Field of Classification Search
CPC ..... G01L 1/2293; B81B 7/0048; B81B 7/007; B81B 2201/0264
See application file for complete search history.

(56) References Cited

U.S. PATENT DOCUMENTS

| | | | |
|---|---|---|---|
| 3,566,216 A | 2/1971 | Doering et al. | |
| 4,050,313 A | 9/1977 | Shimada et al. | |
| 4,173,900 A | 11/1979 | Al et al. | |
| 4,317,126 A | 2/1982 | Gragg, Jr. | |
| 4,454,771 A * | 6/1984 | Shimazoe | G01L 1/18 73/777 |
| 4,511,878 A | 4/1985 | Shimada et al. | |
| 5,178,016 A | 1/1993 | Dauenhauer et al. | |
| 5,483,994 A | 1/1996 | Maurer | |
| 5,600,074 A | 2/1997 | Marek et al. | |
| 5,614,678 A | 3/1997 | Kurtz et al. | |
| 5,644,285 A | 7/1997 | Maurer | |
| 5,760,313 A | 6/1998 | Guentner et al. | |
| 5,773,728 A | 6/1998 | Tsukada et al. | |

(Continued)

FOREIGN PATENT DOCUMENTS

EP 2270455 A2 1/2011

OTHER PUBLICATIONS

Final Rejection Mailed on Apr. 19, 2019 for U.S. Appl. No. 15/388,483, 18 page(s).

(Continued)

*Primary Examiner* — Tran M. Tran
(74) *Attorney, Agent, or Firm* — Alston & Bird LLP

(57) ABSTRACT

A method for sensing force using a sense die is disclosed. The method may include providing a sense die comprising a chip having a slab formed thereon; applying a force to the slab of the sense die; and determining the magnitude of the force applied to the slab via one or more sense elements attached to the slab. In some examples, the ratio of the width of the slab to the distance between the sense elements is greater than 2/1.

7 Claims, 9 Drawing Sheets

(56) References Cited

U.S. PATENT DOCUMENTS

| | | | |
|---|---|---|---|
| 5,811,694 | A | 9/1998 | Kamentser et al. |
| 6,293,160 | B1 | 9/2001 | Shigemoto |
| 6,491,647 | B1 | 12/2002 | Bridger et al. |
| 6,595,065 | B2 | 7/2003 | Tanizawa et al. |
| 6,658,948 | B2 | 12/2003 | Yoshihara et al. |
| 6,858,451 | B2 | 2/2005 | Suzuki et al. |
| 7,234,359 | B2 | 6/2007 | Hirose et al. |
| 7,290,453 | B2 | 11/2007 | Brosh |
| 7,318,349 | B2* | 1/2008 | Vaganov ............ G01P 15/18 |
| | | | 73/514.33 |
| 7,343,812 | B2 | 3/2008 | Stewart et al. |
| 7,360,440 | B2 | 4/2008 | Hirose et al. |
| 7,467,891 | B2 | 12/2008 | Gennissen et al. |
| 7,503,221 | B2 | 3/2009 | Wade |
| 7,726,197 | B2 | 6/2010 | Selvan et al. |
| 7,735,375 | B2 | 6/2010 | Ueda et al. |
| 7,880,247 | B2 | 2/2011 | Vaganov et al. |
| 7,934,429 | B2 | 5/2011 | Ueda et al. |
| 8,171,806 | B2 | 5/2012 | Mizuno et al. |
| 8,316,725 | B2 | 11/2012 | Wade |
| 8,327,715 | B2 | 12/2012 | Bradley et al. |
| 8,757,001 | B2 | 6/2014 | Wade et al. |
| 8,800,391 | B2 | 8/2014 | Zhang et al. |
| 8,806,964 | B2 | 8/2014 | Thanigachalam et al. |
| 9,003,897 | B2 | 4/2015 | Wade et al. |
| 9,003,899 | B2 | 4/2015 | Wade |
| 9,052,246 | B2 | 6/2015 | Wade et al. |
| 9,164,003 | B2 | 10/2015 | Wade |
| 9,261,423 | B2 | 2/2016 | Benfield et al. |
| 9,399,572 | B2 | 7/2016 | Burchard et al. |
| 9,459,161 | B1 | 10/2016 | Galambos et al. |
| 9,664,576 | B2 | 5/2017 | Sato et al. |
| 9,728,652 | B2 | 8/2017 | Elian et al. |
| 9,983,074 | B2 | 5/2018 | Minami et al. |
| 9,995,641 | B2 | 6/2018 | Wade et al. |
| 10,317,297 | B2* | 6/2019 | Van Der Wiel ....... G01L 9/0055 |
| 10,536,779 | B2* | 1/2020 | Kitamura ............. B06B 1/0688 |
| 10,871,413 | B2 | 12/2020 | Zwijze et al. |
| 11,456,258 | B2* | 9/2022 | Rogers ................ H10D 62/122 |
| 2004/0135274 | A1* | 7/2004 | Matsuda ................ B01D 69/02 |
| | | | 264/28 |
| 2004/0177699 | A1 | 9/2004 | Katsumata et al. |
| 2007/0240519 | A1 | 10/2007 | Shimazu et al. |
| 2007/0251328 | A1 | 11/2007 | Selvan et al. |
| 2010/0018324 | A1 | 1/2010 | Kilian et al. |
| 2013/0068022 | A1* | 3/2013 | Jeung ...................... G01P 15/14 |
| | | | 73/702 |
| 2014/0007705 | A1* | 1/2014 | Campbell ................ G01L 1/18 |
| | | | 73/862.628 |
| 2014/0137653 | A1 | 5/2014 | Chiou et al. |
| 2014/0137654 | A1 | 5/2014 | Zwijze et al. |
| 2014/0374848 | A1 | 12/2014 | Koh et al. |
| 2015/0020601 | A1 | 1/2015 | Miyajima et al. |
| 2015/0068315 | A1 | 3/2015 | Davis et al. |
| 2016/0223413 | A1 | 8/2016 | Kubota et al. |
| 2017/0160149 | A1 | 6/2017 | Minami et al. |
| 2017/0307457 | A1 | 10/2017 | Zwijze et al. |

OTHER PUBLICATIONS

List of references cited by examiner Mailed on Apr. 19, 2019 for U.S. Appl. No. 15/388,483, 1 page(s).
List of references cited by examiner Mailed on Sep. 21, 2018 for U.S. Appl. No. 15/388,483, 3 page(s).
Non-Final Rejection Mailed on Sep. 21, 2018 for U.S. Appl. No. 15/388,483, 21 page(s).
Partial European Search Report, EP 17206053.5, 12 pp., May 28, 2018.
Advisory Action received for U.S. Appl. No. 16/573,500, mailed on Jul. 15, 2021, 4 pages.
Advisory Action received for U.S. Appl. No. 16/573,500, mailed on Jul. 18, 2022, 4 pages.
Annex to the communication Mailed on May 2, 2019 for EP Application No. 17206053.5, 3 pages.
Communication from the Examining Division Mailed on May 2, 2019 for EP Application No. 17206053, 2 page(s).
European search opinion Mailed on Sep. 3, 2018 for EP Application No. 17206053, 5 page(s).
Examiner Interview Summary Record (PTOL-413) Mailed on Jun. 28, 2021 for U.S. Appl. No. 16/573,500, 2 page(s).
Final Office Action received for U.S. Appl. No. 16/573,500, mailed on Apr. 28, 2022, 16 pages.
Final Rejection Mailed on Apr. 15, 2021 for U.S. Appl. No. 16/573,500.
List of references cited by examiner Mailed on Sep. 29, 2020 for U.S. Appl. No. 16/573,500, 1 page(s).
Non-Final Office Action received for U.S. Appl. No. 16/573,500, mailed on Aug. 19, 2021, 14 pages.
Non-Final Rejection Mailed on Sep. 29, 2020 for U.S. Appl. No. 16/573,500.
Notice of Allowance and Fees Due (PTOL-85) Mailed on Oct. 5, 2022 for U.S. Appl. No. 16/573,500.
Office Action Appendix Mailed on Jun. 28, 2021 for U.S. Appl. No. 16/573,500, 2 page(s).

* cited by examiner

SILICON PIEZORESISTOR FORCE SENSOR

CROSS-REFERENCE TO RELATED APPLICATIONS

This application is a continuation application of co-pending U.S. patent application Ser. No. 16/573,500, filed Sep. 17, 2019, which is a continuation of U.S. patent application Ser. No. 15/388,483, filed Dec. 22, 2016, which are incorporated herein by reference.

BACKGROUND

In many industrial areas it is necessary to accurately measure the magnitude of a force. Force sensors can be used to measure a force or a pressure. Various designs can be used and can rely on a displacement of a component or a stress-field applied to a stress-sensitive element or component to measure the presence of a force and/or an amount of the force present on the sensor. Force sensors can experience forces above their designed operating ranges (e.g., overforce situations), which can result in damage to the force sensors.

SUMMARY

In an embodiment, a sense die may comprise a chip comprising a slab; one or more sense elements supported by the slab, wherein the ratio of the width of the slab to the distance between the one or more sense elements is at least 2/1; one or more bond pads supported by a first side of the chip, each of the one or more bond pads electrically coupled to at least one of the one or more sense elements; a structural frame disposed on the first side of the chip, wherein the structural frame is disposed at least partially about the slab; and one or more electrical contacts extending through the structural frame, wherein the one or more electrical contacts are electrically coupled to the one or more bond pads.

In an embodiment, a method of sensing a force using a sense die may comprise providing a sense die comprising a chip having a slab formed thereon; applying a force to the slab of the sense die; and determining the magnitude of the force applied to the slab via one or more sense elements attached to the slab, wherein the ratio of the width of the slab to the distance between the one or more sense elements is greater than approximately 2/1.

In an embodiment, a sense die may comprise a chip comprising a slab; an actuation element configured to contact the slab at or near the center of the slab, and configured to apply a force to the slab; and one or more sense elements supported by the slab, wherein the ratio of the width of the slab to the distance between the one or more sense elements is greater than approximately 2/1, and wherein the distance between the sense elements is centered on the contact point between the actuation element and the slab.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
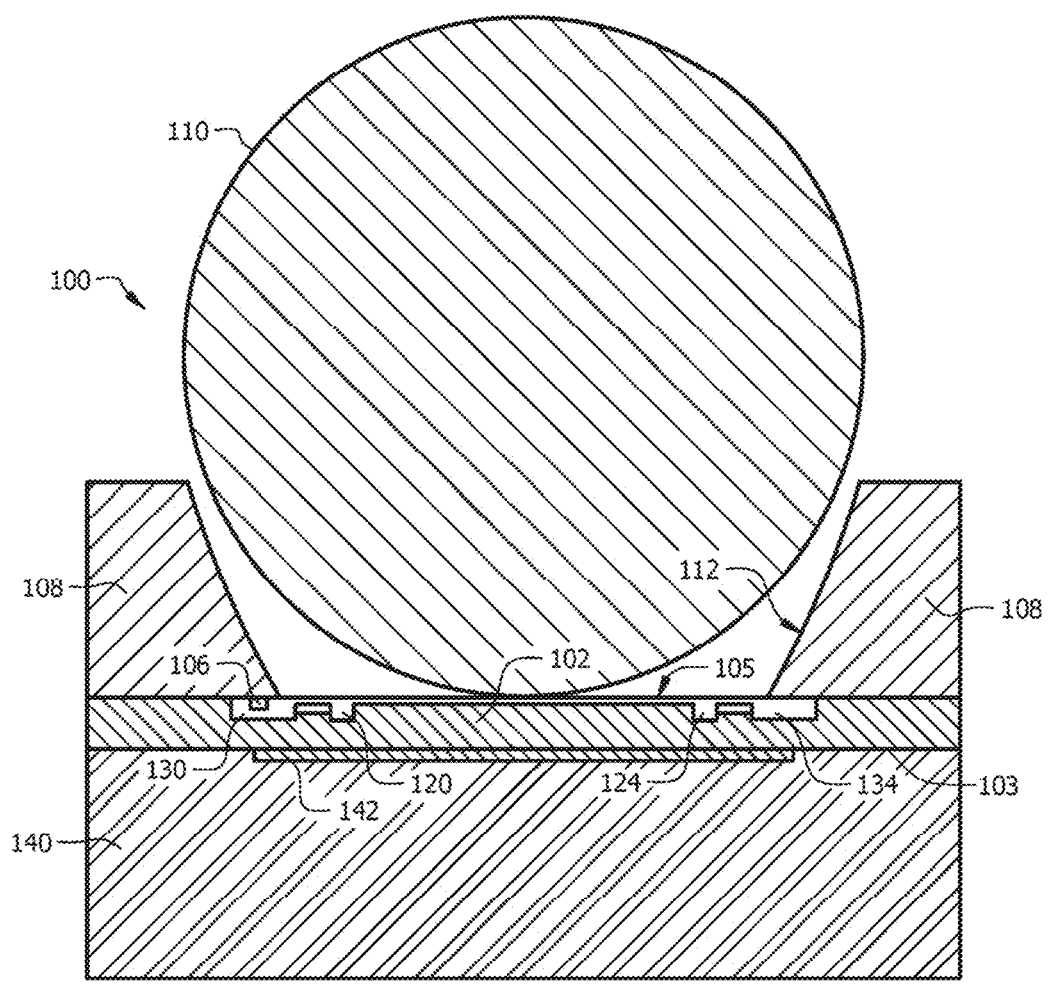
FIG. 1 illustrates a schematic cross-section of a sense die according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for improving the signal output from a sense die configured to detect force applied to the sense die. Embodiments of the disclosure may comprise piezoresistive elements unusually close to the center of the die, where the load-bearing actuation element makes contact to the die face. Through stress mapping of the surface of the sense die, it was discovered that there is a small localized area of very high signal-generating stress near the actuation element. When piezoresistive elements are implanted in this location, die sensitivities can be up to 100 times greater or higher than traditional locations for the piezoresistive elements. Because the small areas of high stress constitute a localized contact phenomenon, no anisotropic etch is needed to form a diaphragm, and therefore a "slab" die can be used. Using a slab die may have the advantage of significantly higher proof loads (i.e. higher overload protection), while at the same time reducing cost because it is no longer necessity to complete the anisotropic etch. Additionally, this method of positioning the piezoresistive elements may allow for a smaller die to be used, which may lower costs as well.

Typical uses of piezoresistive elements position the piezoresistive elements at or near the center edge of a formed diaphragm. Typical force sensors may use a stress field that is relatively distant from the contact point between the actuation element and the sense die (or the load point). Embodiments of the disclosure may use a localized stress field very near the load point. This localized stress field may be much higher in magnitude than the typically used distant stress field, leading to higher die output for a given load.

A technical benefit of the described method of positioning the piezoresistive elements may include much higher die output for a given load. Additionally, since a full wafer thickness may be used, no specifically-defined diaphragm is required, and therefore the proof load is significantly higher. Also, the costs of the sense die may be reduced because no etch steps are required to form a diaphragm, no specially patterned adhesive is required under the die (just a continuous layer rather than a "picture frame" pattern with an unsupported central area), and a smaller die can be used (costs are proportional to the size of a die, where even a 30% reduction is die side length may translates to a cost reduction of up to 50%). The same general design and orientation of the piezoresistive elements may be similar to a traditional pressure or force sensor, but the location of the piezoresistive elements may be adjusted.

FIG. 1 illustrates an embodiment of a typical sense die 100 according to some embodiments that can be used to detect a force, including a pressure. As shown, the sense die 100 can include a diaphragm or slab 102, and a substrate 140 located near a first surface 103 of the sensor. The slab 102 may comprise one or more sense elements 120, 124 connected to one or more electrical contacts 106. The sense elements 120, 124 may be located on a second surface 105 of the slab 102. Optionally, a sidewall 108 can be attached to a portion of a second surface 105 of the sensor. An actuation element 110 can be present within a cavity 112 formed by the sidewall 108 and can serve to transfer a force to the second surface 105 of the slab 102. In some embodiments, the slab 102 may comprise a solid slab. In some embodiments, the slab 102 may be attached to the substrate 140 via an adhesive 142.

The sense die 100 may be formed from silicon or other semiconductor material. While the sense die 100 is described with respect to being formed from silicon, it should be understood that other materials can also be used. In an embodiment, the sense die 100 can begin as a silicon chip and be processed to form the sense die 100, as described in more detail herein. In some embodiments, the silicon chip may include a recess formed on the first surface 103 to form a diaphragm 102. A variety of micro-fabrication techniques including, but not limited to, lithography techniques, wet etching techniques, and dry etching techniques may be used to form the recess. In some embodiments, the diaphragm 102 may be fabricated on the sense die 100 by back-side etching of a silicon die (e.g., with a KOH etching technique, deep reactive ion etching, or other etching technique). However, it is contemplated that any suitable process may be used, as desired. The diaphragm 102 may have a height or thickness that is less than the thickness of the edges of the sense die 100, thereby forming the diaphragm 102.

The diaphragm or slab 102 is configured to flex in response (or at least have some elastic response) to an applied force, creating stress fields that extend through the one or more sense elements 120 and 124, thereby allowing the applied force to be determined. In some embodiments, the elastic response of the slab 102 may be microscopic in nature. In some embodiments, the applied force can be present in the form of a differential pressure across the slab 102. In some embodiments, an actuation element 110 may be in contact with the second surface 105 of the slab 102 to transfer a force to the slab 102. The actuation element 110 can comprise a mechanical coupling between an exterior force and the slab 102. In some aspects, the actuation element 110 can comprise a mechanical actuation element configured to transfer a force to the slab 102. In some embodiments, the actuation element 110 may include a spherical object (such as the sphere shown in FIG. 1), a pin, an extender, a button, any other activation device, and/or a combination thereof. It may be appreciated that other types of actuators may be utilized, such as, for example, slidable mounted plungers or shafts, point of contact type components other than spherical objects, and/or "T"-shaped transfer mechanisms, in accordance with alternative embodiments. If desired, only a portion of an outer surface of the actuation element 110 may be spherical in shape or take on a particular shape. The actuation element 110 may be made of any material. For example, the actuation element 110 may be formed from stainless steel, a polymer, a ceramic, jeweled, another suitable metal, and/or another suitable material. In some cases, the actuation element 110 may include a stainless steel ball bearing. It is contemplated, however, that other generally spherical and other shaped elements may be used as or as part of the actuation element 110, if desired, including polymer based objects.

The deflection resulting from a force applied on the diaphragm through an applied pressure and/or through the actuation element 110 may generally result in the deflection of the slab 102. The slab 102 may be configured to detect a deflection that is predominantly in a direction perpendicular to the plane of the slab 102. In this sense, the sense die 100 is configured to measure a uniaxial force that is provided normal to the plane of sense die 100.

The sense die 100 may have one or more sensing elements 120 and 124 disposed on or adjacent to the slab 102, such as piezoresistive sensing elements or components formed using suitable fabrication or printing techniques. For example, starting with the silicon sense die 100, standard pattern, implant, diffusion, and/or metal interconnect processes may be used to form one or more elements 120 and 124 on a surface 103, 105 of the sense die 100. For example, one or more piezoresistive sense elements 120 and 124 may be formed on the slab 102. The piezoresistive sense elements 120 and 124 may be configured to have an electrical resistance that varies according to an applied mechanical stress (e.g. deflection of the slab 102). The piezoresistive elements 120 and 124 can thus be used to convert the applied force or pressure into an electrical signal. In some instances, the piezoresistive components may include a silicon piezoresistive material; however, other non-silicon materials may be used.

One or more bond pads 130 and 134 may be formed on the upper surface 105 of the sense die 100 and adjacent to the slab 102. Metal, diffusion, or other interconnects may be provided to interconnect the one or more piezoresistive sensor elements 120 and 124 and the one or more bond pads 130 and 134. As shown in FIG. 1, one or more of the piezoresistive sensor elements 120 and 124 can be electrically coupled to one or more of the bond pads 130 and 134.

In some embodiments, the sense elements 120 and 124 may comprise a plurality of sense elements, for example two sense elements, three sense elements, four sense elements, or more. Similarly, the bond pads 130 and 134 may comprise a plurality of bond pads, for example two bond pads, three bond pads, four bond pads, or more. FIG. 1 indicates typical locations for the piezoresistive elements 120 and 124. These locations may be selected to be within an area of the slab 102, where the slab 102 experiences forces from the contact with the actuation element 110.

Embodiments of the disclosure describe a sense die 100 where the piezoresistive elements are located much closer to the contact area between the actuation element 110 and the slab 102 (or diaphragm), than a typical sense die.

Figure 2A:
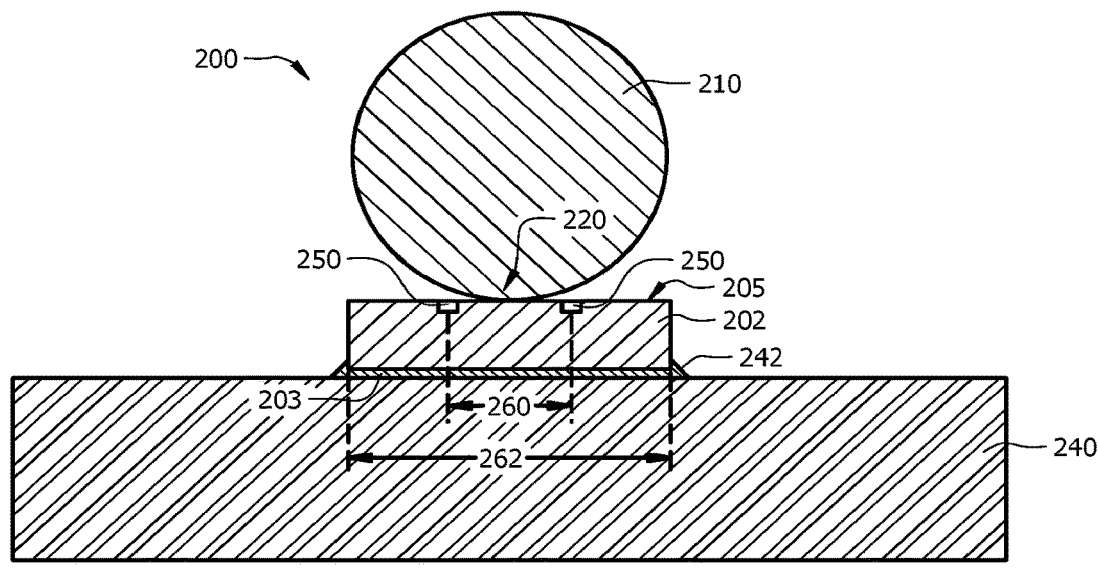
FIGS. 2A-2C illustrate cross-sectional views of an actuation element, a slab and a sense die according to embodiments of the disclosure.
Figure 2B:
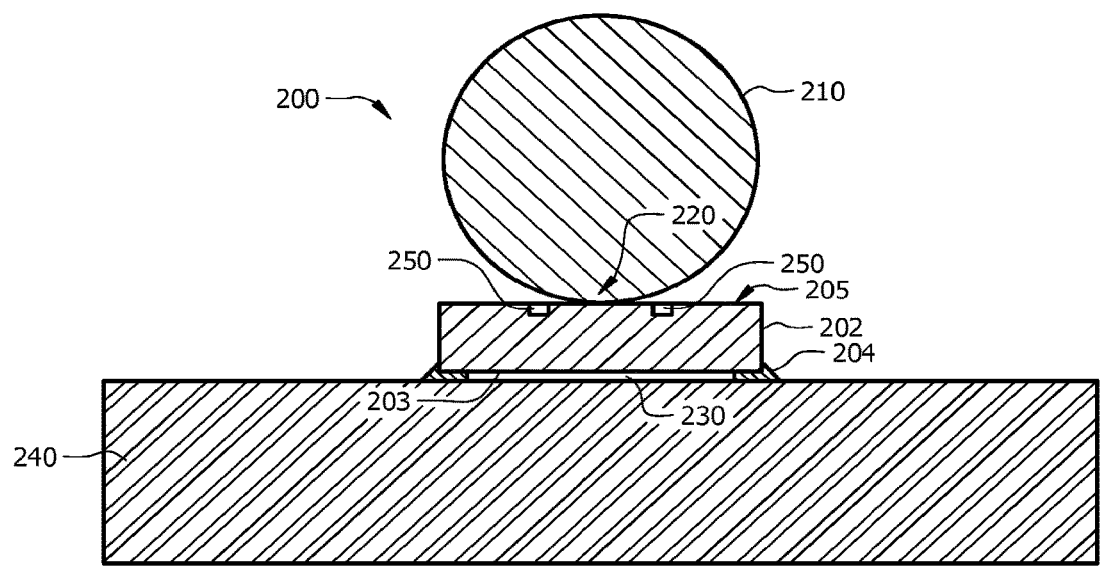
Figure 2C:
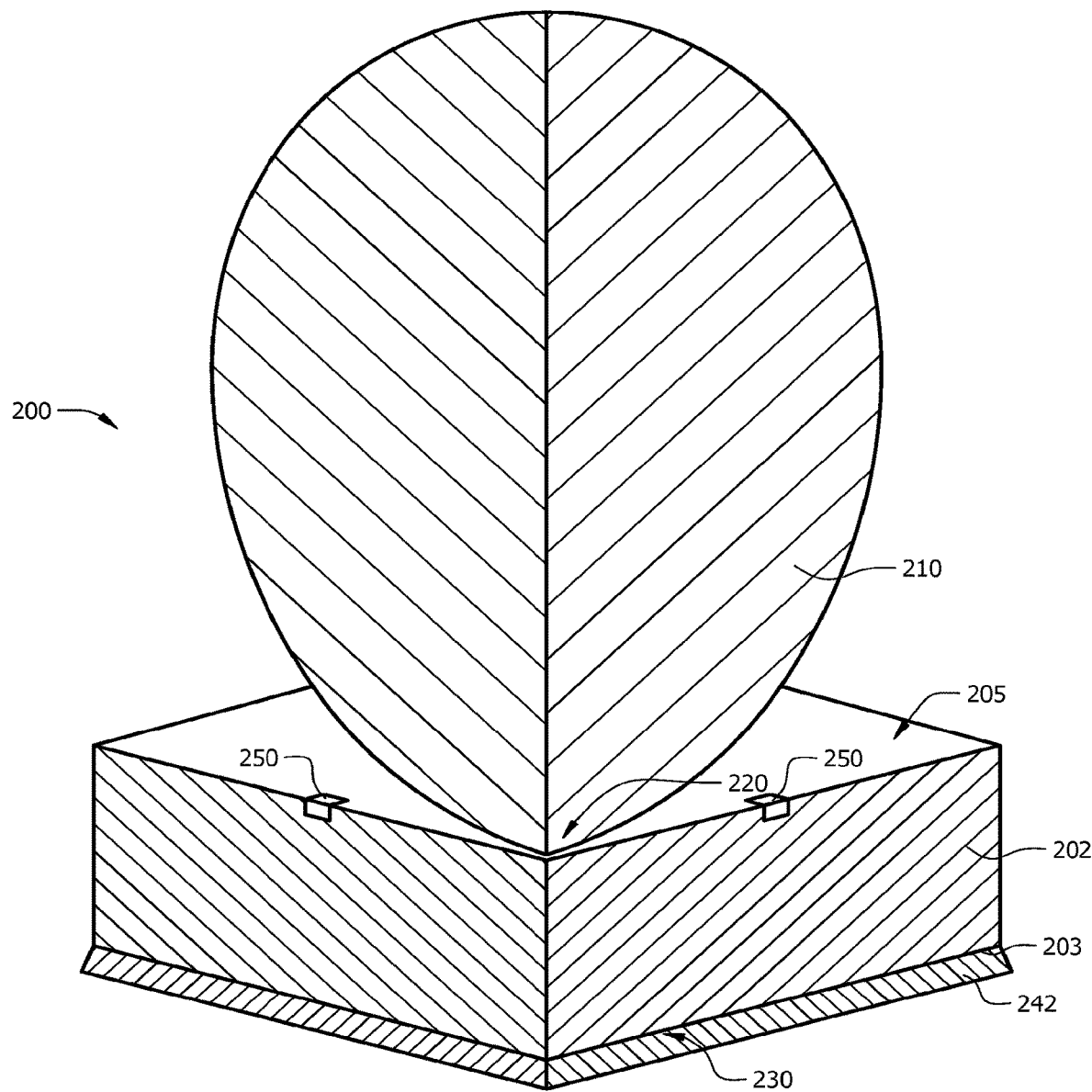

FIGS. 2A-2C illustrate cross-sectional views of an actuation element 210 (which may comprise a ball bearing) and a slab 202 of a sense die 200. The actuation element 210 may comprise a spheroid shape. The actuation element 210 may contact and apply pressure to a contact area 220 between the actuation element 210 and the slab 202. The slab 202 may comprise a first surface 203, which may be attached to a structural frame 204. The slab 202 may comprise a second surface 205 configured to contact the actuation element 210.

In some embodiments, the actuation element 210 may comprise stainless steel. In some embodiments, the actuation element 210 may comprise glass, sapphire, or another similar material. In some embodiments, the total length of the sense die 200 may be reduced by approximately 20% to 30% compared to a typical sense die 200.

FIG. 2A illustrates a sense die 200 comprising a slab 202 attached to a substrate 240 via an adhesive layer 242. The slab 202 may comprise sense elements 250 located on the surface 205 of the slab 202. The distance between the sense elements 250 is indicated by distance 260. The width of the slab 202 is indicated by width 262.

In the embodiment shown in FIG. 2B, the slab 202 may comprise an etched cavity 230 on the first surface 203 of the slab 202. However, in other embodiments, such as FIGS. 2A and 2C, the slab 202 may not be etched. In other words, the slab 202 may not comprise any thinned areas or cavities on either surface 203 and 205 of the slab 202.

FIG. 2C illustrates a double cross-section of the slab 202, illustrating a quarter view of the slab 202 and actuation element 210. The slab 202 may comprise four sense element 250 located about the contact point 220 between the slab 202 and the actuation element 210.

In some embodiments, the sense elements 250 may be closer together than in a typical sense die. In some embodiments, the distance 260 between the sense elements 250 may be centered on the contact point 220 between the actuation element 210 and the slab 202.

Referring to FIG. 2A, in some embodiments, the ratio between the width 262 of the slab 202 and the distance 260 between the sense elements 250 may be greater than approximately 3/1. In some embodiments, the ratio between the width 262 of the slab 202 and the distance 260 between the sense elements 250 may be greater than approximately 5/1. In some embodiments, the ratio between the width 262 of the slab 202 and the distance 260 between the sense elements 250 may be greater than approximately 7/1. In some embodiments, the ratio between the width 262 of the slab 202 and the distance 260 between the sense elements 250 may be greater than approximately 11/1. In some embodiments, the ratio between the width 262 of the slab 202 and the distance 260 between the sense elements 250 may be less than approximately 20/1. In some embodiments, the sense elements 250 may not touch one another.

In some embodiments, the location of the sense elements 250 may be chosen based on the anticipated stress at a particular location on the surface 205 of the slab 202.

Figure 3A:
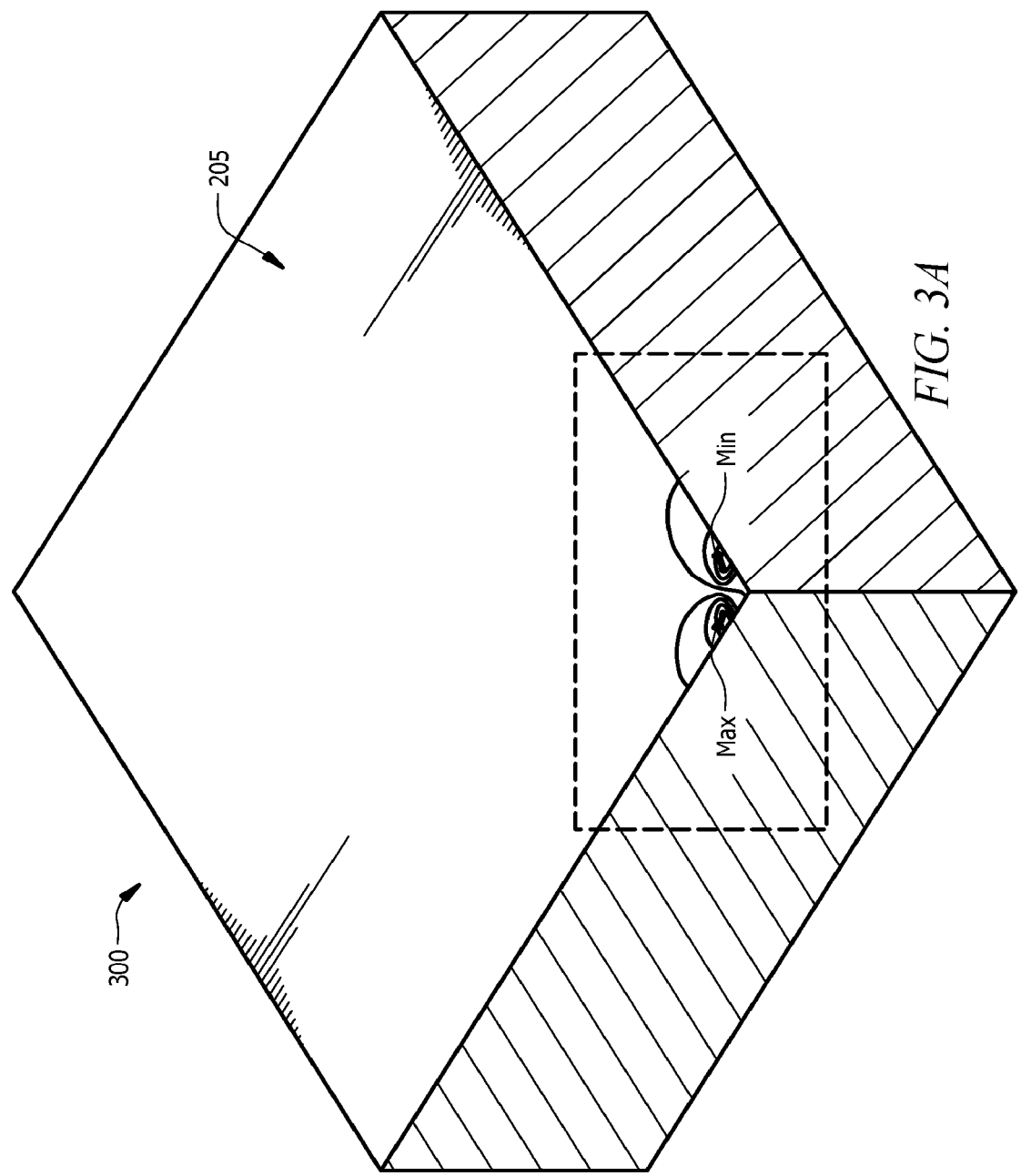
FIGS. 3A-3C illustrate a stress map of a surface of a sense die according to an embodiment of the disclosure.
Figure 3B:
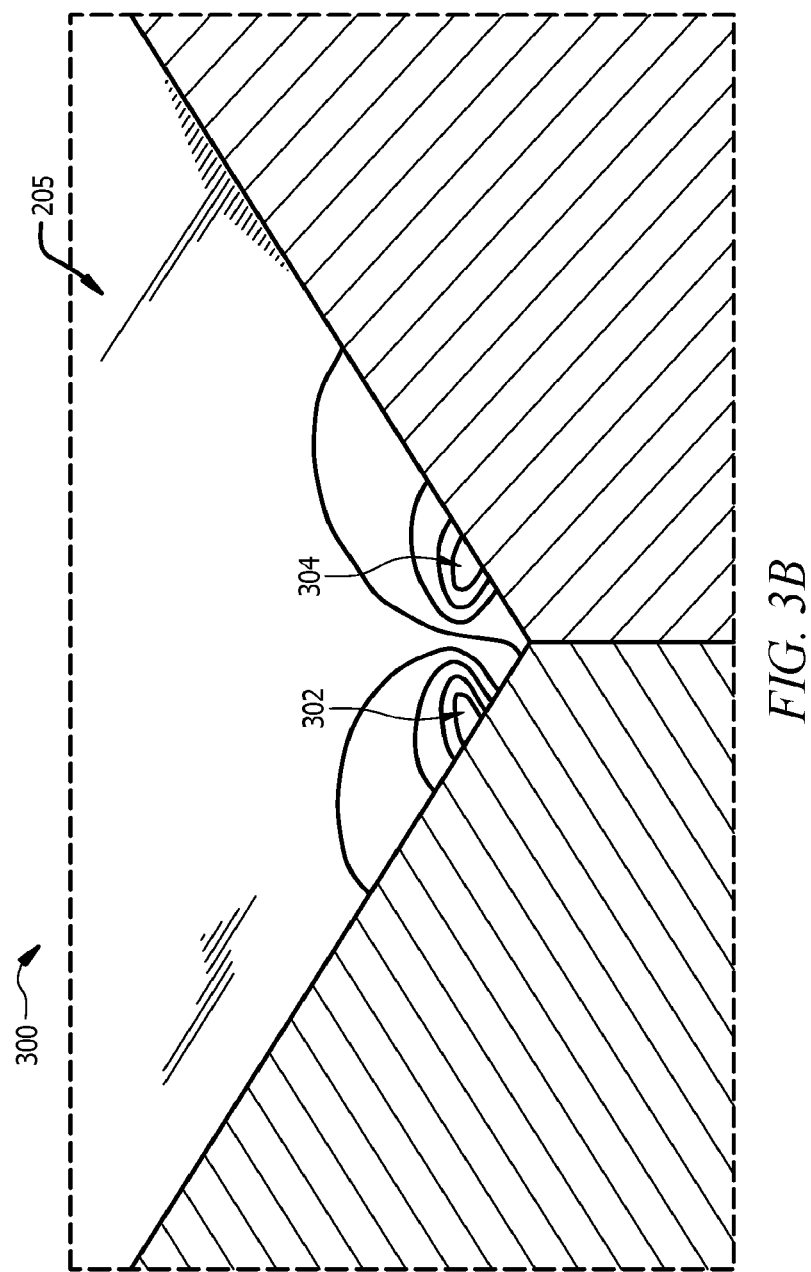
Figure 3C:
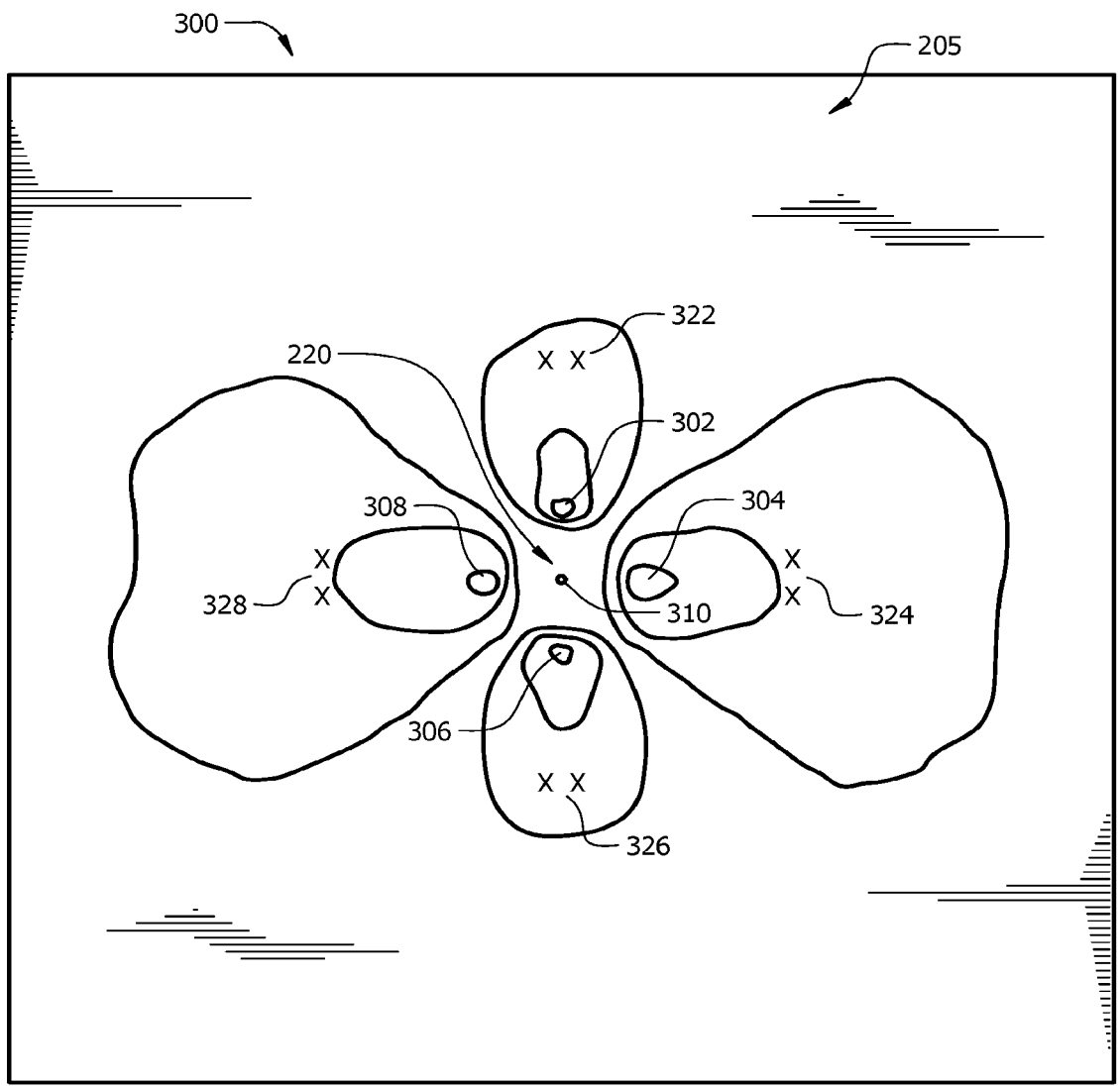

Referring to FIGS. 3A-3C, a stress map 300 is shown illustrating the stress fields resulting from a force applied to the second surface 205 of the slab 202 by the actuation element 210. The slab 202 and actuation element 210 are shown above. The stress map 300 may comprise a plot of the difference between stress in the x direction (Sx) and stress in the y direction (Sy) or Sx-Sy. The largest values, both positive and negative, may indicate the locations on the surface 205 of the slab where the stress is the highest in one direction. These areas may be called "hotspots" or high stress areas. The stress field generated on the surface 205 at the hotspots 302 and 304 may be significantly greater than the stress field generated at other areas of the surface 205. The hotspots 302 and 304 may create an ideal location for a piezoresistive element to be placed on the surface 205, where the piezoresistive element may detect the stress created at that location. The hotspots 302 and 304 may be located closer to the contact area 220 than typical locations for piezoresistive elements.

The stress map 300 shown in FIGS. 3A-3B may be cross-sectioned to show a quarter of the total surface 205 of the slab 202, wherein the corner 310 illustrates the center of the contact area 220 (as shown above) between the actuation element and the slab. Referring to FIG. 3C, a full stress map 300 may comprise up to four hotspots 302, 304, 306, and 308 surrounding the center 310 of the contact area 220 between the actuation element and the slab. The typical locations for piezoresistive elements are indicated by "x" 322, 324, 326, and 328.

Using the information from the stress map 300 shown in FIGS. 3A-3C, the piezoresistive elements (such as 120 and 124 described above) may be placed within one of the hotspots 302, 304, 306, and 308 indicated by the stress map 300. While the stress at the typical locations 322, 324, 326, and 328 for the piezoresistive elements may be within an area that will detect stress on the slab surface 205, the hotspots 302, 304, 306, and 308 may produce significantly higher outputs, thereby improving the accuracy and sensitivity of the piezoresistive elements. For example, Sx-Sy stress at the typical locations 322, 324, 326, and 328 for piezoresistive elements may be approximately ±70 megapascal (MPa), and stress in the hotspots 302, 304, 306, and 308 may be approximately ±1400 MPa (approximately 20 times higher than the typical stress readings). The increased stress reading may produce an increased signal output for the piezoresistive elements.

Unlike a typical pressure sensor comprising an anisotropic etch, the Sx-Sy stress peak measured on the surface 205 of the slab moves outward radially from the contact area 220 as the load on the surface 205 is increased. In other words, the hotspots may change in location based on the magnitude of the force applied to the slab via the actuation element. For example, the distance from the center 310 at which the hotspot occurs may increase as the magnitude of the force increases. This concept may be illustrated by the following graphs and figures.

Piezoresistive elements located at different positions with respect to the center of the surface 205 were evaluated at a range of forces applied to the surface 205. The results are show in the graphs of FIGS. 4A-4B. As an example, the locations ranged from approximately 39 microns (μm) from the center to approximately 310 μm from the center.

Figure 4A:
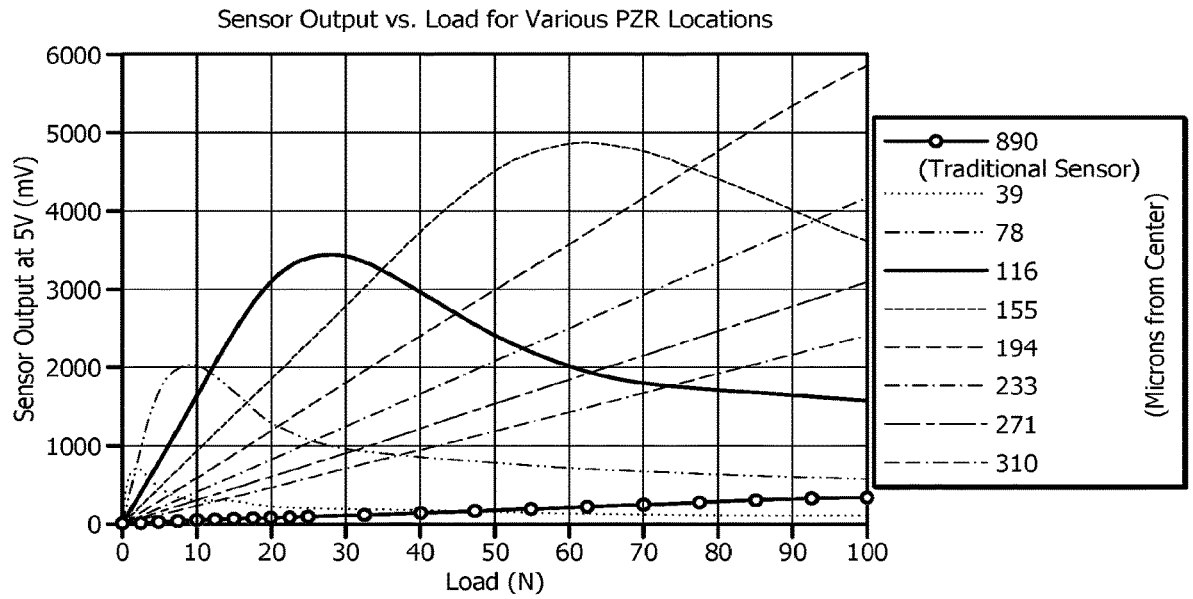
FIGS. 4A-4B illustrate the relationships between load on the sense die, location of the sense elements, and sensor output according to an embodiment of the disclosure.

Referring to FIG. 4A, the sensor output in millivolts (mV) is plotted against the load applied to the slab in Newtons (N). Each line indicates a different location for the piezoresistive elements, measured in radians from the center of the contact area between the slab and the actuation element. The traditional location of the piezoresistive elements is also plotted, for reference, wherein the distance from the center is higher in a traditional sensor. For each line on the graph, the sensor output builds as the load increases until the Sx-Sy peak passes through the location of the piezoresistive element, and then then the output drops off. Sensor function may be optimal before the peak in the lines.

Figure 4B:
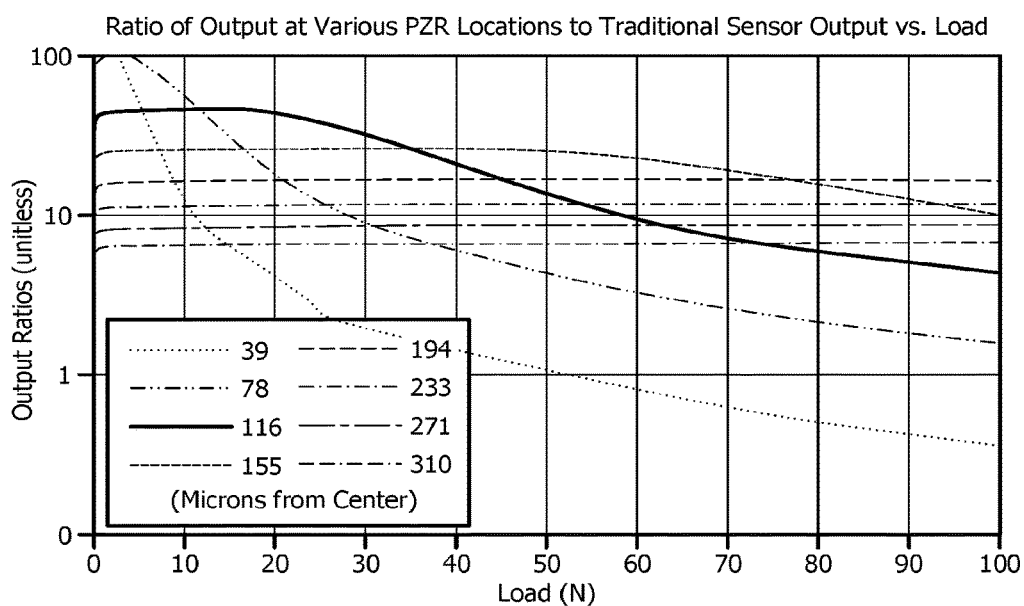

Referring to FIG. 4B, the graph illustrates the results show in FIG. 4A that have been normalized using a standard of the traditional sensor location output (at a distance of 890 μm), where the results for each of the locations have been divided by the standard. The graph shown in FIG. 4B illustrates that the sensor output may be relatively constant before the peak (for that location), and may be usable for determining stress on the slab at that location.

For most sensor applications, it may be possible to estimate the range of the load expected for a particular application. Using the graphs and the estimated load (in N), an optimal location for the piezoresistive elements may be chosen. For example, if the expected load is less than 5 N, the location for the piezoresistive elements may be chosen to be at a distance of between approximately 30 to 80 μm from the center. As another example, if the expected load is between 10 and 20 N, the location for the piezoresistive elements may be chosen to be at a distance of between approximately 100 to 120 μm from the center.

Figure 5:
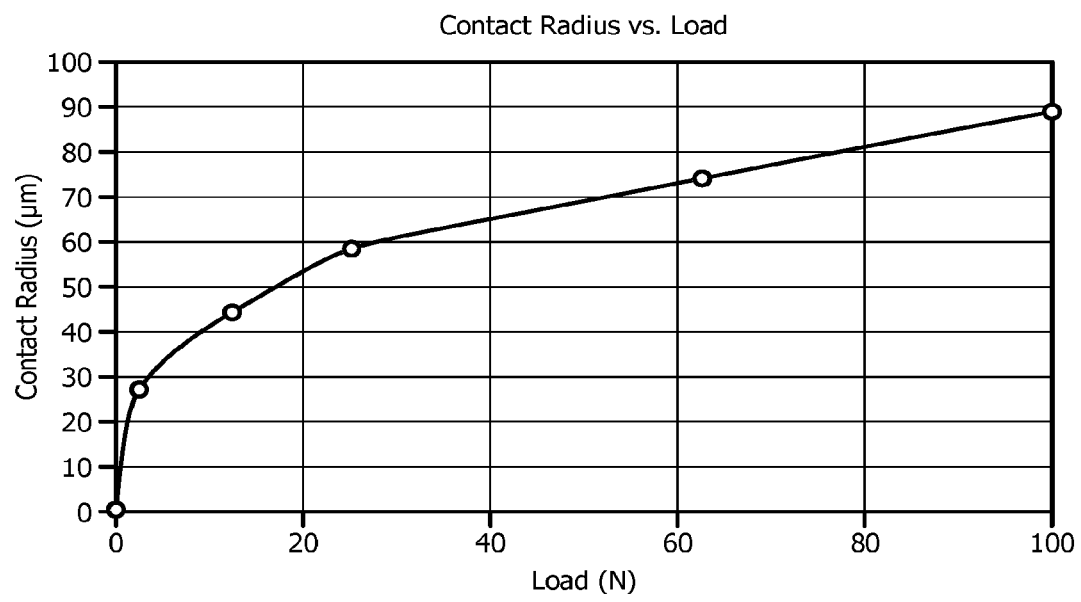
FIG. 5 illustrates the relationship between contact radius and load on the sense die according to an embodiment of the disclosure.

Referring to FIG. 5, an additional graph illustrates the approximate relationship between the contact radius between the flat surface of the slab and the curved surface of the spherical actuation element, and the estimated load that will be applied to the sense die. As the load increases, what is initially a point contact between the slab and the actuation element, widens out into circular contact. FIG. 5 is a plot of the radius of that circle of contact vs. force applied by the actuation element. In some embodiments, it may be desirable to locate the sense elements outside the contact radius, to avoid contact between the actuation element and the sense elements. However, in some embodiments, the actuation element may contact one or more of the sense elements during the use life of the sense die.

To further evaluate the effect of locating the piezoresistive elements closer to the center of a slab, sense die were analyzed to solve for the generated signal. At approximately 1 N force applied to the slab, the signal from a piezoresistive element located at the typical location of 890 μm from the center may produce approximately 3.6 mV. When the location of the piezoresistive element was changed to 310 μm from the center, the signal may rise to approximately 27.3 mV (approximately 7.6 times the typical output). When the location of the piezoresistive element was changed to 150 μm from the center, the signal may rise to approximately 87.2 mV (approximately 246 times the typical output).

Additionally, it may be desirable to provide accurate measurements for forces lower than 1 N. Force detection in this low range may typically be difficult to achieve with adequate over-load protection. To further evaluate the effect of locating the piezoresistive elements closer to the center of a slab, sense dies were tested to determine the generated signal in force ranges of approximately 1 N (100 g), approximately 0.1 N (10 g), approximately 0.01 N, and approximately 0.001 N.

As described above, the closer a piezoresistive element is location to the center (i.e. the smaller the distance from the center), the higher the sensitivity of the output signal. In the following results, the closest location for the piezoresistive element was approximately 150 μm from the center. For a force range of 0.1 N, at a location of 150 μm from the center, the sensor output may be approximately 8.8 mV.

As the force ranges decrease below 1 N, it may be proportionally harder to develop sufficient output signal. Therefore, the use of piezoresistive elements positioned closer to the center of the slab may allow for improved signal output for lower force ranges.

Figure 6A:
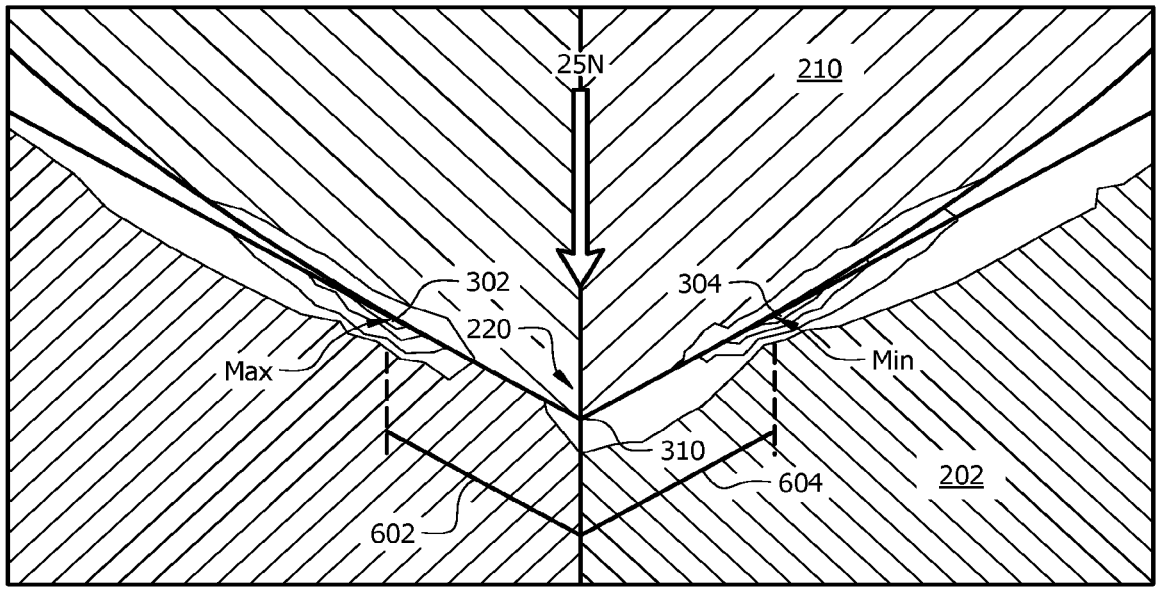
FIGS. 6A-6B illustrate cross sectional views of a sense die that illustrate the relationship between contact radius and load on the sense die according to an embodiment of the disclosure.
Figure 6B:
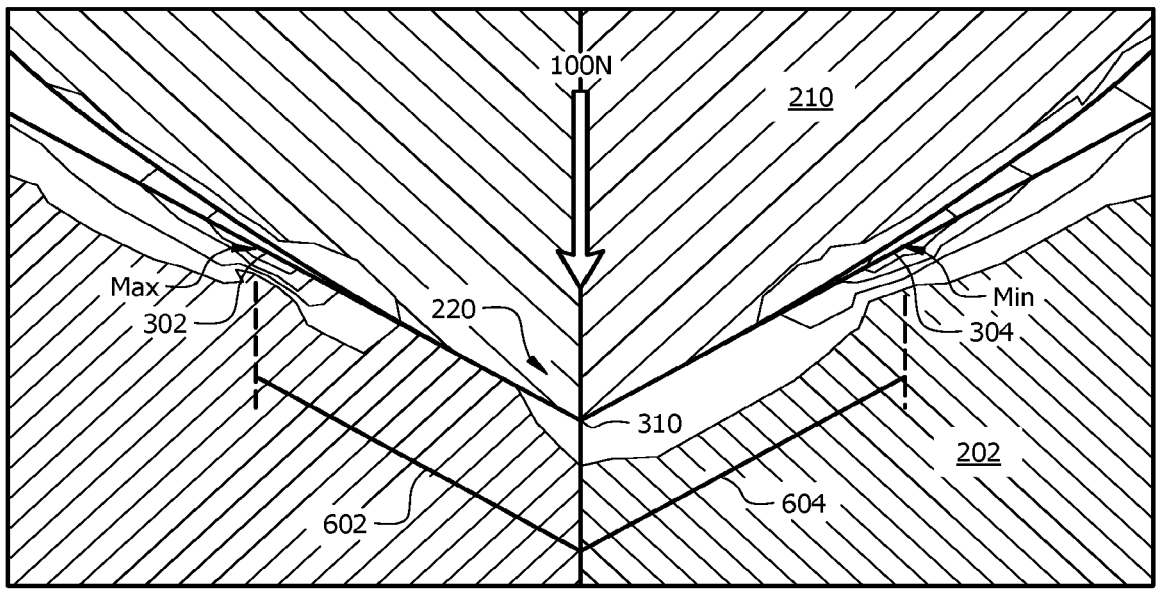

FIGS. 6A-6B further illustrate the relationship between the contact radius, i.e. the distance from the center 310 of the slab 202 at which the piezoresistive element is located, and the estimated load that will be applied to the sense die. In FIG. 6A, the force applied to the actuation element 210 is approximately 25 N. The contact radius to the first hotspot 302 is indicated by distance 602. Similarly, the contact radius to the second hotspot 304 is indicated by distance 604.

In FIG. 6B, the force applied to the actuation element 210 is increased to approximately 100 N. The distance 602 to the first hotspot 302 has increased accordingly. Similarly, the distance 604 to the second hotspot 304 has increased accordingly. Therefore, the optimal location for the piezoresistive elements to be located at or near a hotspot 302 and 304 depends on the amount of force that is anticipated to be applied to the slab 202.

The sensitivity (measured in mV/V) of the sense elements described above was determined via modeling, and then compared to a standard or typical sensor. The different locations of the sense elements were compared to one another as well. In some embodiments, the sensitivity ratio (when compared to a typical sensor) may be greater than approximately 1/1. In some embodiments, the sensitivity ratio may be greater than approximately 5/1. In some embodiments, the sensitivity ratio may be greater than approximately 10/1. In some embodiments, the sensitivity ratio may be greater than approximately 20/1. In some embodiments, the sensitivity ratio may be greater than approximately 25/1.

In a first embodiment, a sense die may comprise a chip comprising a slab; one or more sense elements supported by the slab, wherein the ratio of the width of the slab to the distance between the one or more sense elements is at least 2/1; one or more bond pads supported by a first side of the chip, each of the one or more bond pads electrically coupled to at least one of the one or more sense elements; a structural frame disposed on the first side of the chip, wherein the structural frame is disposed at least partially about the slab; and one or more electrical contacts extending through the structural frame, wherein the one or more electrical contacts are electrically coupled to the one or more bond pads.

A second embodiment can include the sense die of the first embodiment, wherein the sense elements comprise piezoresistive elements.

A third embodiment can include the sense die of the first or second embodiments, further comprising an actuation element configured to contact the slab at or near the center of the slab.

A fourth embodiment can include the sense die of the third embodiment, wherein the distance between the sense elements is centered on the contact point between the slab and the actuation element.

A fifth embodiment can include the sense die of any of the first to fourth embodiments, wherein the ratio of the width of the slab to the distance between the one or more sense elements is greater than approximately 5/1.

A sixth embodiment can include the sense die of any of the first to fifth embodiments, the ratio of the width of the slab to the distance between the one or more sense elements is greater than approximately 10/1.

A seventh embodiment can include the sense die of any of the first to sixth embodiments, wherein the locations of the one or more sense elements are determined by mapping the force on the slab applied by the actuation element, and identifying one or more hotspots on the slab where the force is higher than the surrounding areas.

An eighth embodiment can include the sense die of any of the first to seventh embodiments, wherein the locations of the one or more sense elements are determined by determining a correlation between the estimated force that will be applied to the slab and the desired location for sense elements on the slab.

In a ninth embodiment, a method of sensing a force using a sense die may comprise providing a sense die comprising a chip having a slab formed thereon; applying a force to the slab of the sense die; and determining the magnitude of the force applied to the slab via one or more sense elements attached to the slab, wherein the ratio of the width of the slab to the distance between the one or more sense elements is greater than approximately 2/1.

A tenth embodiment can include the method of the ninth embodiment, further comprising determining a correlation between the estimated force that will be applied to the slab and the desired location for sense elements on the slab.

An eleventh embodiment can include the method of the tenth embodiment, wherein as the estimated force increases, the desired location for the sense elements increases in distance from the center of the slab.

A twelfth embodiment can include the method in of any of the ninth to eleventh embodiments, wherein applying a force comprises contacting the slab with an actuation element.

A thirteenth embodiment can include the method of the twelfth embodiment, wherein the distance between the sense elements is centered on the contact point between the slab and the actuation element.

A fourteenth embodiment can include the method of any of the ninth to thirteenth embodiments, wherein the ratio of the width of the slab to the distance between the one or more sense elements is greater than approximately 5/1.

A fifteenth embodiment can include the method of the any of the ninth to fourteenth embodiments, further comprising mapping the force on the slab applied by the actuation element; identifying one or more hotspots on the slab where the force is higher than the surrounding areas; and determining the location for a piezoresistive element to be located on the slab based on the location of the hotspots.

In a sixteenth embodiment, a sense die may comprise a chip comprising a slab; an actuation element configured to contact the slab at or near the center of the slab, and configured to apply a force to the slab; and one or more sense elements supported by the slab, wherein the ratio of the width of the slab to the distance between the one or more sense elements is greater than approximately 2/1, and wherein the distance between the sense elements is centered on the contact point between the actuation element and the slab.

A seventeenth embodiment can include the sense die of the sixteenth embodiment, wherein the sense elements comprise piezoresistive elements.

An eighteenth embodiment can include the sense die of the sixteenth or seventeenth embodiments, wherein the ratio of the width of the slab to the distance between the one or more sense elements is greater than approximately 5/1.

A nineteenth embodiment can include the sense die of any of the sixteenth to eighteenth embodiments, wherein the ratio of the width of the slab to the distance between the one or more sense elements is less than approximately 20/1.

A twentieth embodiment can include the sense die of any of the sixteenth to nineteenth embodiments, wherein the sense elements are located at or near hotspots identified on the surface of the slab by force mapping.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A method of sensing a force using a sense die, the method comprising:
   providing a slab die having a first surface and an opposing second surface with a contact area on the first surface;
   applying an external force to the contact area of the slab die by contacting the slab die with a spherical actuation element, wherein the spherical actuation element creates a localized stress field along the first surface of the slab die adjacent the contact area;
   determining a magnitude of the applied force via a plurality of sense elements;
   identifying one or more high stress areas on the slab die based on the magnitude of the applied force, wherein the force at each of the one or more high stress areas is higher than the force at surrounding areas; and
   positioning the plurality of sense elements about the contact area of the slab die based on a location of the one or more high stress areas such that a ratio of a width of the slab die to a first distance between two sensing elements of the plurality of sense elements measured across a center of the contact area is at least 2/1.

2. The method of claim 1, wherein the slab die is free from an etched cavity that forms a diaphragm that includes the contact area.

3. The method of claim 1, wherein each of the plurality of sense elements comprises one or more piezo-resistive elements.

4. The method of claim 1, wherein the contact area is at or near a geometric center of the first surface.

5. The method of claim 1, wherein the plurality of sense elements is positioned in a pattern that is centered at the contact area.

6. The method of claim 1, wherein the spherical actuation element comprises a spherical shaped surface that engages the contact area.

7. The method of claim 1, wherein a second distance from the center of the contact area to each of the plurality of sense elements is based on an estimated load associated with the externally applied force.

* * * * *